United States Patent
Thorsen

(10) Patent No.: US 7,725,674 B2
(45) Date of Patent: May 25, 2010

(54) HARD DRIVE ERASER

(75) Inventor: Jack D. Thorsen, Greenland, NH (US)

(73) Assignee: Ensconce Data Technology, Inc., Portsmouth, NH (US)

(*) Notice: Subject to any disclaimer, the term of this patent is extended or adjusted under 35 U.S.C. 154(b) by 0 days.

(21) Appl. No.: 11/583,150

(22) Filed: Oct. 19, 2006

(65) Prior Publication Data
US 2007/0101055 A1    May 3, 2007

Related U.S. Application Data

(60) Provisional application No. 60/728,320, filed on Oct. 20, 2005.

(51) Int. Cl.
*G06F 12/00* (2006.01)
(52) U.S. Cl. ...................... 711/166; 711/112
(58) Field of Classification Search ................ 711/112, 711/170, 159, 166
See application file for complete search history.

(56) References Cited

U.S. PATENT DOCUMENTS

| | | | |
|---|---|---|---|
| 4,494,156 A * | 1/1985 | Kadison et al. ............... 360/48 |
| 4,932,522 A | 6/1990 | Milovich |
| 4,984,225 A | 1/1991 | Ando |
| 5,056,081 A | 10/1991 | Hsieh |
| 5,206,843 A | 4/1993 | Kaburagi |
| 5,375,243 A * | 12/1994 | Parzych et al. ................ 726/17 |
| 5,652,695 A * | 7/1997 | Schmitt ...................... 361/685 |
| D382,861 S * | 8/1997 | Corrington et al. ......... D14/369 |
| 5,721,665 A | 2/1998 | Schultz |
| 6,070,228 A * | 5/2000 | Belknap et al. ............. 711/118 |
| 6,076,142 A * | 6/2000 | Corrington et al. .......... 711/114 |
| 6,131,141 A | 10/2000 | Ravid |
| 6,142,796 A * | 11/2000 | Behl et al. .................. 439/131 |
| 6,351,374 B1 * | 2/2002 | Sherry ........................ 361/685 |
| 6,570,727 B1 | 5/2003 | Tamura et al. |
| 6,651,192 B1 | 11/2003 | Viglione et al. |
| 7,027,249 B2 | 4/2006 | Hasegawa et al. |
| 2001/0051963 A1 * | 12/2001 | Nishikawa .................. 707/527 |
| 2002/0042919 A1 * | 4/2002 | Sturza et al. .................. 725/67 |
| 2002/0078026 A1 * | 6/2002 | Fergus ........................... 707/1 |
| 2002/0112034 A1 * | 8/2002 | Feik ............................ 709/219 |

(Continued)

FOREIGN PATENT DOCUMENTS

JP    08129864 A  *  5/1996

OTHER PUBLICATIONS

Gutmann, Peter, "Secure Deletion of Data from Magnetic and Solid-State Memory," Jul. 1996, Sixth USENIX Security Symposium Proceedings.*

(Continued)

*Primary Examiner*—Shane M Thomas
*Assistant Examiner*—Michael C Krofcheck
(74) *Attorney, Agent, or Firm*—Dickstein Shapiro LLP

(57) ABSTRACT

Systems, apparatuses and methods for erasing hard drives. A system, which can be configured as a stand alone and portable apparatus, includes a control device configured to support an erase module. The erase module is configured to erase a hard drive such that data erased from the hard drive is forensically unrecoverable. The system further includes a user interface and at least one drive bay configured to provide communication between a hard drive and the control device.

13 Claims, 11 Drawing Sheets

U.S. PATENT DOCUMENTS

| | | | |
|---|---|---|---|
| 2002/0129257 A1* | 9/2002 | Parmelee et al. | 713/180 |
| 2002/0196572 A1* | 12/2002 | Bress et al. | 360/57 |
| 2003/0074576 A1* | 4/2003 | Kelly | 713/200 |
| 2003/0103288 A1* | 6/2003 | Suzuki | 360/66 |
| 2004/0051989 A1 | 3/2004 | Hasegawa et al. | |
| 2004/0252628 A1 | 12/2004 | Detzler | |
| 2005/0082182 A1 | 4/2005 | McBrady | |
| 2005/0141118 A1 | 6/2005 | Ito | |
| 2005/0200885 A1* | 9/2005 | Nishizawa et al. | 358/1.15 |
| 2005/0219732 A1 | 10/2005 | Ito | |
| 2005/0237563 A1* | 10/2005 | Yoshiura et al. | 358/1.14 |
| 2006/0023389 A1 | 2/2006 | Ito | |

OTHER PUBLICATIONS

International Preliminary Report on Patentability and Written Opinion, May 2, 2008.

International Search Report dated Nov. 26, 2007.

* cited by examiner

HARD DRIVE ERASER

CROSS REFERENCE TO RELATED APPLICATIONS

This application claims benefit to U.S. Provisional Patent Application No. 60/728,320 filed on Oct. 20, 2005, the disclosure of which is incorporated herein by reference.

BACKGROUND

The present invention relates to computer and data security, particularly to an apparatus and method for erasing data contained upon magnetic data storage media.

Computer and data security are important concerns for individuals, businesses and governments. Particularly, secure techniques for erasing or otherwise disposing of electronically stored data are growing concerns. U.S. Patent Application Publication No. 2004/0252628, which is commonly assigned to Ensconce Data Technology, Inc. and is incorporated herein by reference, describes the developing importance of secure data destruction for individuals, businesses and governments. Legislation has also pushed the importance of data security to the forefront. To comply with federal regulations, companies now need to completely and reliably eliminate all sensitive data on hard disk drives prior to disposing of or reusing the drive. Specifically provisions of the Financial Services Modernization Act (2003)(Gramm-Leach-Bliley), the Fair and Accurate Credit Transaction Act of 2003 (FACT Act), the Corporate and Criminal Fraud Accountability Act of 2002 (Sarbanes-Oxley), and the Health Insurance Portability and Accountability Act (HIPPA) all contain data security requirements. The regulations under these acts set requirements for securely handling sensitive data.

In response to the increasing need for computer and data security, techniques for erasing or destroying electronically stored data have been developed. One such development is data eraser software, which is intended to make deleted files unrecoverable as well as eliminate the extraneous data that is created and stored by many applications, especially those involving the Internet. Such software is run on the computer containing the hard drive that stores the information to be deleted. The software causes an over-write of certain data on the hard drive. However, the computer's BIOS and/or components of the hard drive itself may interfere with the software, preventing complete erasure of data on the hard drive. For example, the BIOS of the computer and/or hard drive components may prevent data on certain areas of the hard drive from being erased. Therefore, the data is not securely erased or destroyed and can often be recovered by known forensic data recovery techniques.

Accordingly, what is needed is an apparatus and method for erasing data contained on a storage medium, such as a hard drive, such that it is unrecoverable by known forensic data recovery techniques.

SUMMARY

Embodiments provide apparatuses and methods for erasing hard drives. A system, which can be configured as a stand alone and portable apparatus, includes a control device configured to support an erase module. The erase module is configured to erase a hard drive such that data erased from the hard drive is forensically unrecoverable. The system further includes a user interface and at least one drive bay configured to provide communication between a hard drive and the control device. According to exemplary methods, a hard drive is erased using a low frequency. According to another aspect, a certificate is generated certifying that a hard drive was erased.

Additional features and embodiments will be apparent from the following detailed description and drawings, which illustrate exemplary embodiments.

DETAILED DESCRIPTION OF PREFERRED EMBODIMENTS

Figure 1:
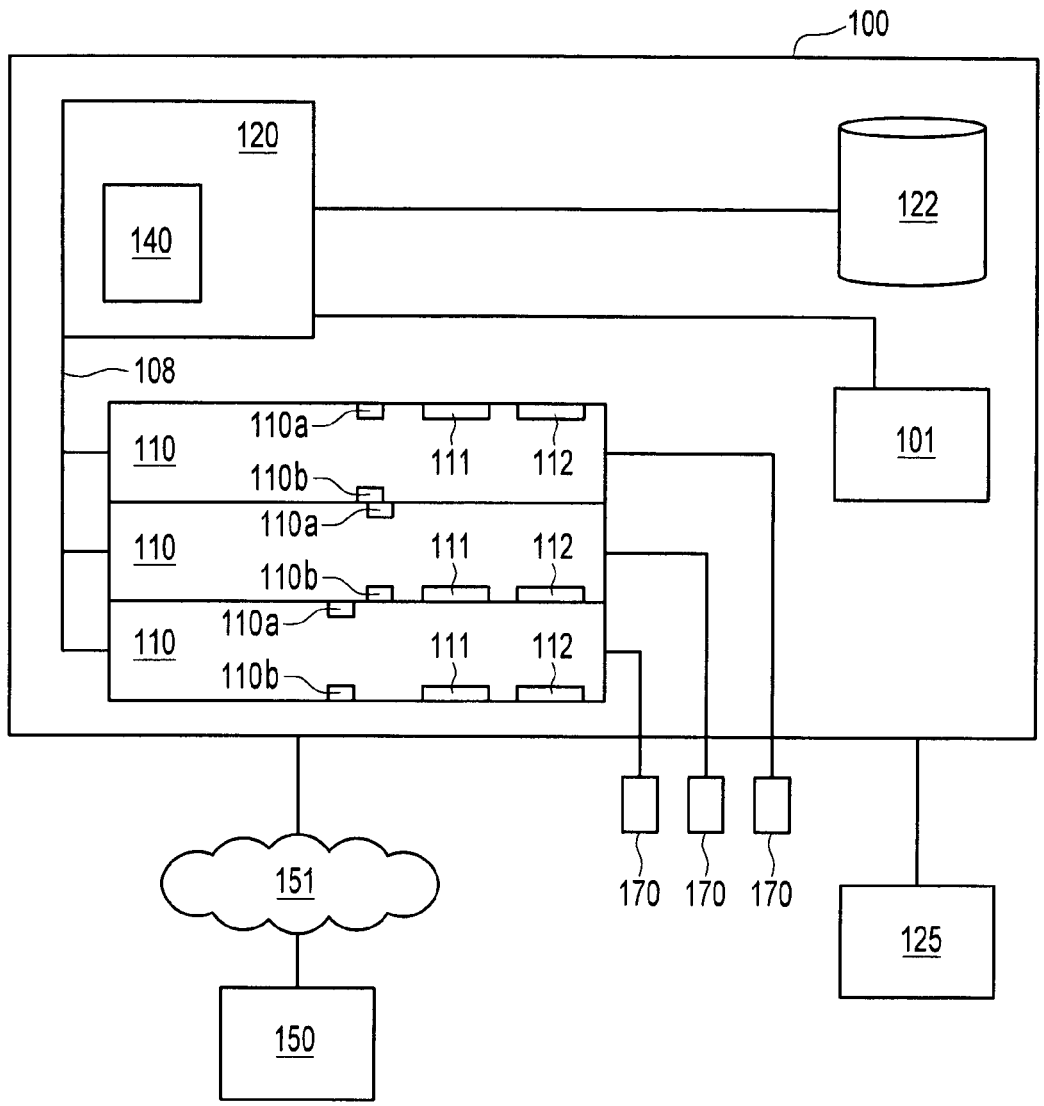
FIG. 1 is a block diagram illustrating a hard drive erase system according to an exemplary embodiment of the invention.

In the following detailed description, reference is made to the accompanying drawings, which form a part hereof and show by way of illustration specific embodiments that the invention may be practiced. In the drawings, like reference numerals refer to like elements. The illustrated embodiments are described in sufficient detail to enable those skilled in the art to practice them, and it is to be understood that other embodiments may be utilized, and that structural and logical changes may be made. The progression of process steps described is exemplary of the embodiments; however, the sequence of steps is not limited to that set forth herein and may be changed, with the exception of steps necessarily occurring in a certain order.

FIG. 1 illustrates a hard drive erase system 100 according to an exemplary embodiment. The system 100 is a stand alone system that provides secure erasure capability of hard disk drives. The system 100 enables hard disk drives to be erased such that the data selected for erasure is forensically unrecoverable. The term forensically unrecoverable means that data is not recoverable by presently used techniques.

The system 100 includes a control device 120 capable of supporting software applications. For example, the device 120 can be a central processing unit, a server, among others. The control device 120 supports an erase module 140. The erase module 140 can be one or more computer software program applications for erasing data from storage media. For example, the module 140 can include software available from the Magnetic Recording Research Center (MRRC) at the University of California, San Diego, specifically the software titled "HDDErase 2.0 Beta," among other software applications.

The control device 120 is in communication with a storage device 122. The storage device can be any form of memory capable of storing electronic data. According to one exemplary embodiment of the invention, the erase module 140 causes data about each erase procedure to be stored on the storage device 122. In this manner, the system 100 maintains a log of erase procedures. The stored data can include hard drive identification information, such as the drive serial number, the drive manufacture, drive model, drive size; a start date/time stamp; an end date/time stamp; the erasure method; an indication of success or failure; the user who initiated the erase procedure; erase certificates; among others.

The system 100 also includes a user interface 101, which enables the user to input information into the system 100 and gain information from the system 100. Preferably the user interface 101 is a graphical user interface (GUI). The user interface 101 can be for example, a display device and keyboard, or a touch screen monitor, among others.

The system also includes at least one hard drive bay 110. In the illustrated embodiment the system 100 includes a plurality of hard drive bays 110. Each bay 110 can be populated with at least one hard drive 170. Accordingly, the system 100 can support the erasure of multiple hard drives 170 simultaneously. The drive bays can support at least one type of hard drive 170, but preferably supports multiple hard drive 170 types. Each bay 100 optionally includes a locking mechanism 111 and a status indicator 112 for signaling the status of the hard drive 170 in the bay 110. Preferably, the control device 120 is in communication with the locking mechanism 111 and is aware of whether the locking mechanism 111 is in a locked or unlocked state. Although the status indicator 112 is shown on the drive bay 110, status of hard drive 170 in each bay 110 could instead be displayed on the user interface 101.

Each drive bay 110 can be operated independently of other drive bays 110 and individual hard drives 170 can be connected and disconnected from the system 100 drive bays 110 without interfering with the operation of other drive bays 110. Accordingly, the user can remove one hard drive 170 from and connect a hard drive 170 to the system 100 without powering down the system 100 or interrupting an ongoing erase procedure.

The drive bays 110 enable communication between one or more hard drives 170 and the system 100 such that the system 100 can erase data contained on the hard drive(s) 170. Optionally, the system 100 can be configured such that the user can access and read the contents of a hard drive 170 that is in a drive bay 110 via the user interface 101.

Each drive bay 110 includes at least one connecting device, such as a port, cable, probe, or any device, mechanism or means for establishing communication between system 100 and a hard drive 170. In one embodiment, a drive bay 110 includes one or more cables 110a that connect to a hard drive 170, e.g., a data cable and a power cable. Other devices and means for providing communication between the system 100 and the hard drive 170 can also be employed. The system 100 can accommodate different hard drive 170 types that have differing cabling requirements. Additionally, a drive bay 110 can include a probe 110b, which attaches to a hard drive 170 at locations other than typical cable attachment locations. For example, the probe 110b can connect to inject a signal the printed circuit board of the hard drive 170. Alternatively, the system 100 is configured to communicate with the hard drive 170 in situ, i.e., as it is found in a particular device, such as a personal computer. It should be understood that the system 100 can include one or more dive bays 110 and also be configured to connect directly to one or more hard drives 170 in situ.

Optionally, the system 100 is in communication with an output device 125 for outputting information, such as the status of hard drives 170 and erase certificates, for example by printing, emailing, or other output mechanism. In one embodiment, the output device is a printer for printing certificates (e.g., in the form of labels) certifying that a particular hard drive 170 has been erased. Alternatively, the output device could be integrated with the system 100.

Also optionally, the system 100 can be in communication with the Internet 151 or other computer network (not shown). The control device 120 can be configured to provide erase certificates and logs to a remote device 150, such as a computer, which can be part of a computer network controlled by a third party independent of the system 100 user. According to one embodiment, the third party receives erase certificates from a variety of sources, for example, from multiple systems 100, and stores the erase certificates. In this manner, the third party keeps data regarding hard drive erasures which can be readily accessed as needed.

Figure 2:
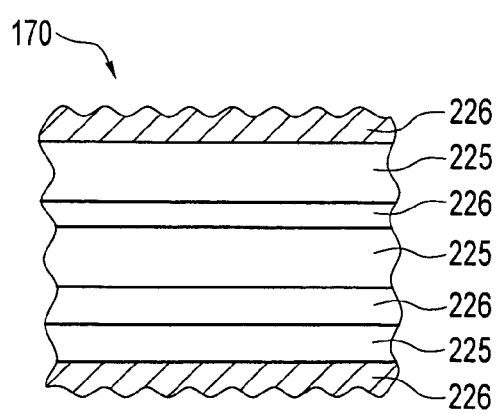
FIG. 2 is a schematic diagram of a portion of a hard drive.

In conventional write-over erase procedures, a read/write head writes over a portion of a disk drive 170. FIG. 2 is a schematic diagram of the surface of a storage portion of a hard drive 170. The read/write head moves in the paths or tracks 225 depicted in FIG. 2. The fringes 226 of the tracks 225 may be magnetized to some extent during the data writing process, although the fringes 226 may be magnetized relatively weakly as compared to the central area of the tracks 225. Moreover, data in the fringes 226 may be incompletely erased by the write-over process. Such incompletely erased data may be recovered with forensic technologies. The system 100, however, enables complete erasure of a hard drive 170, such that data erased from the drive 170 cannot be forensically recovered. Note that the track 225 and fringes 226 are only shown schematically and that there may be relatively gradual rather than sudden transitions between where the tracks 225 (where a write-over is sufficiently complete so that data is unrecoverable) and the fringes 226) where data is recoverable due to incomplete write-over).

In one embodiment, the control module 140 provides a "low frequency" write-over of the entire hard drive 170 to be erased. The write over may be performed, for example by a software program, such as the HDDErase 2.0 Beta Software. The low-frequency is the frequency of the magnetizing electrical current provided to the magnetizing write heads in the hard drive 170 being erased. The low-frequency is chosen to be lower than the frequency normally used by the hard drive 170 to write data. As the frequency is lowered, the effective write-over area of the track 225 is widened. Preferably, the low-frequency for a given drive is chosen to be low enough to increase the area of the track 225 so that there are no fringes 226 left with sufficient data that may be forensically recovered, i.e., to completely erase the drive 170. A predetermined number of such write-overs are conducted to erase the drive 170. The user can select the number of write-overs or use a default selection.

The low-frequency of the write-over depends on the type of hard drive 170 to be erased. For example, for a Seagate Barracuda drive, the low-frequency used is preferably between about 20 Mhz and about 0 Mhz as compared to the normal frequency of about 50 Mhz or greater. A frequency of 0 Mhz causes the drive 170 to be overwritten with a DC signal. As conventionally used, hard drives 170 will not perform a "DC Erase." In an exemplary embodiment, the erase module causes the hard drive 170 to perform a DC Erase by providing a signal to the hard drive 170 through the printed circuit board (not shown) of the hard drive 170.

Optionally, the module 140 is configured to erase hard drives 170 by a variety of different methods. For example, the system can be configured to erase a hard drive 170 using a low-frequency erase procedure as described above and one or more conventional write-over processes, such as multiple write-over procedures or off-track write-over procedures.

In another embodiment, the module 140 copies predetermined files from the hard drive 170 to the storage device 122, a different hard drive 170 in a different bay 110, or an external hard drive (not shown). The module 140 then completely erases the drive and replaces the predetermined copied files on the drive. The module 140 can also be configured to ghost (i.e., completely copy) a hard drive 170 onto a different hard drive 170. Further, the module 140 can also be configured to provide post-erase procedures, such as reformatting or repartitioning of the hard drive 170.

In an additional embodiment, the module 140 is configured to provide privacy protection erase processes that do not require any data on a hard drive 170 to be read prior to the erase procedure. For this, the module 140 writes sectors of the hard drive 170 with one or more flags (i.e., predetermined data). After the erase procedure is complete, the module 140 reads the previously flagged portions of the drive 170 to ensure that the data was erased. Alternatively, the module 140 could first write over the drive 170, then perform an erase procedure and then read the drive to ensure that the data was erased. With these procedures, there is no need to read the data originally contained on a hard drive 170.

In a further embodiment, module 140 is configured to provide certificates providing information regarding a hard drive 170 that has been erased or otherwise processed by the system 100. The certificate can contain, for example, hard drive identification information, such as the drive serial number, the drive manufacture, drive model, drive size; a start date/time stamp; an end date/time stamp; the erasure method or procedure conducted (e.g., ghosting, formatting, etc.); an indication of success or failure; the user who initiated the erase procedure; among other information. In one aspect, a condition for certification is that the drive bay 110 remains closed and locked for the entire erasure process. The certificate can be in any format (e.g., any file format, electronic, printed, among others).

Figure 3A:
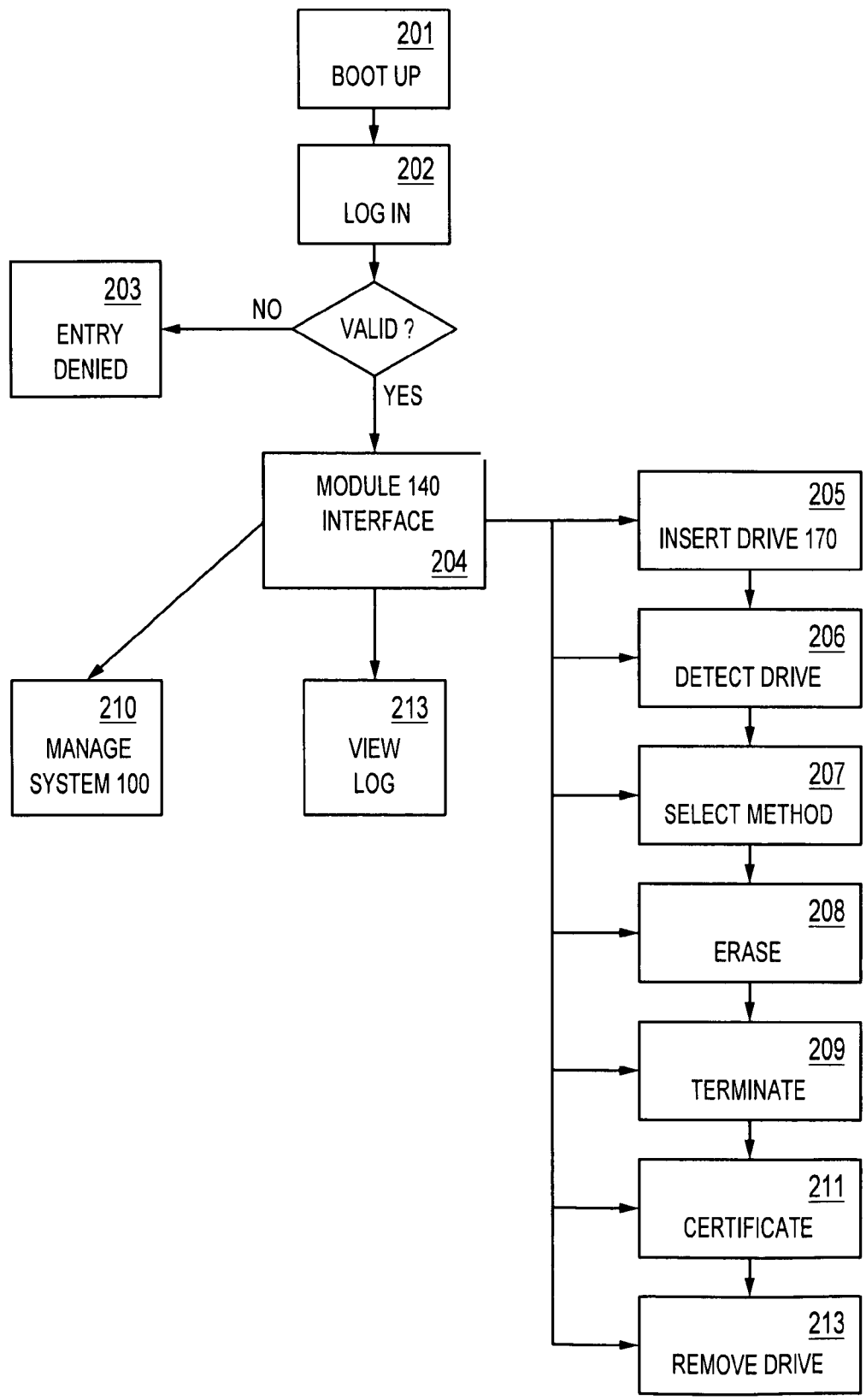
FIG. 3 is a flow chart illustrating a method for erasing a hard drive according to an exemplary embodiment of the invention.

FIG. 3A illustrates one embodiment of a process for erasing a hard drive 170 using the system 100 (FIG. 1) according to an embodiment of the invention. It should be understood that the sequence of the steps described in connection with FIG. 3A can be altered and additional steps may be added.

In step 201 the system 100 is activated or "booted up" by the user. Upon system boot, the user is presented with a graphical user interface 101. Optionally, the user is required to enter login information using the user interface 101. The requirement for login information is particularly useful if use of the system 100 is to be restricted to specific users. Any suitable login scheme can be used, such as a pass code, biometrics, and voice recognition, among others.

Upon entering invalid login information in step 202, the user is prevented from accessing the erase module 140 in step 203. If the user inputs valid login information in step 202 the user is able to interface with the module 140 at step 204. Multiple users may have access to the system 100 at a same time.

Using the user interface 101, the user can begin an erase procedure, view erase logs and certificates stored on the storage device 122, and manage the system 100. These procedures will be described in more detail below.

The user begins an erase procedure at step 205. For this, the user 140 installs a hard drive 170 to be erased and locks the drive bay 110 to which the hard drive 170 was installed. Alternatively, the system 100 can be connected to the hard drive 170 in situ. At step 206, the erase module 140 detects that the hard drive 170 is installed and the locking mechanism 111 is in a locked state.

In step 207, the user can then select the erase method to be used by inputting information into the user interface 101. Alternatively, the user can accept a default erase method preset in the system 100. In one embodiment, the user can also select to have certain files copied from the hard drive 170 to storage device 122 (or a different hard drive 170 in a different bay 110), and then replaced on the drive after it is erased, or to have the contents of the hard drive 170 ghosted to the different hard drive 170.

Once the erase method is selected, the user initiates the erase procedure in step 208. The user may allow the erase procedure to be completed or may terminate the procedure prior to completion. Upon completion or termination of the erase procedure in step 209 (whether or not successful), the results are stored on the storage device 122.

In step 211, the user selects to receive an erase certificate. In one embodiment the certificate is printed in the form of a label to be affixed to the drive 170. Optionally, the certificate can also be sent in electronic form or other form, to a third party. For example, the erase certificate may be sent in electronic form via the Internet 151 to a third party. The third party can be a certificate service that will verify the certificate to prove that the hard drive 170 has been successfully or unsuccessfully erased.

In step 213, the user removes the erased hard drive 170 from the drive bay 110. If the user has printed an erase certificate (e.g., in label form), the user places the erase certificate on the erased hard drive 170.

In step 210, the user can manage the system 100, including all bays 110. The user can, for example set, or change their own password, select default erase methods for the drive bays 100, among others. The user can also receive updates for the erase module 140.

In step 212, the user can view the system 100 logs and erase certificates. Optionally, the erase module 140 can be configured to enable the user to search the erase logs based on desired search criteria.

Figure 3B:
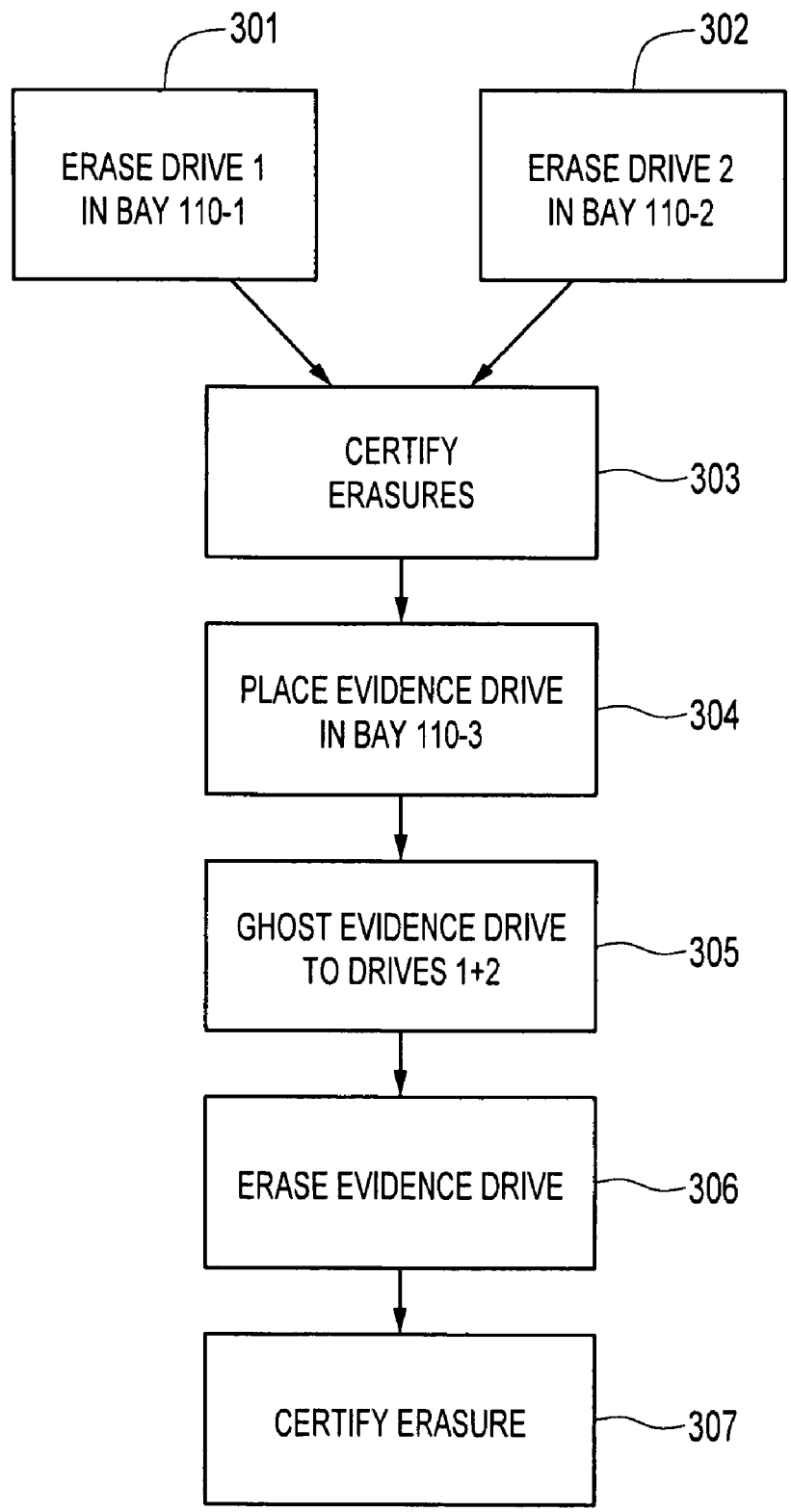

FIG. 3B illustrates a process of using a system 100 having at least first second and third drive bays 110-1, 110-2, 110-3, respectively according to another embodiment of the invention. The method depicted in FIG. 3B is particularly useful in forensic applications. If evidence of a crime or event is in the form of a hard drive 170 or data thereon, it is necessary to preserve the hard drive 170 and any data thereon, but it is also desirable to analyze the hard drive 170 and its data without unduly disturbing the evidence and while maintaining a clear chain of custody. A solution is to copy the evidence hard drive to one or more other hard drives that are known to be free of data.

In step 301 and 302, first and second hard drives 170-1, 170-2 are placed in drive bays 110-1, 110-2, respectively. The first and second hard drives 170-1, 170-2 are securely erased to ensure that no data is present on either drive 170. In step 303, the erase procedures are certified as described above in connection with step 211 of FIG. 3A.

In step 304, the evidence hard drive 170-3 is placed in a third drive bay 110-3. The drive is then ghosted to each of the first and second drives 170-1, 170-2 in drive bays 110-1, 110-2. That is, all data from the evidence drive is copied to each of the first and second drives 170-1, 170-2 in drive bays 110-1, 110-2.

If desired, the evidence drive 170-3, the drive is erased securely in step 306. A certificate for this erase procedure and/or ghosting procedure can also be provided in step 307. The evidence drive, whether or not erased, may then be kept by appropriate authorities or returned to its owner. The copied first and second drives 170 can be analyzed. Alternatively, if needed, one of the copied hard drives 170-1, 170-2 can be stored by appropriate authorities as evidence.

Although the process described above in connection with FIG. 3B include making two copies of a hard drive 170, additional or fewer copies can be made as necessary or desired.

FIGS. 4-13 depict structural configurations for a hard drive erase system 100 (FIG. 1) according to exemplary embodiments of the invention.

Figure 4:
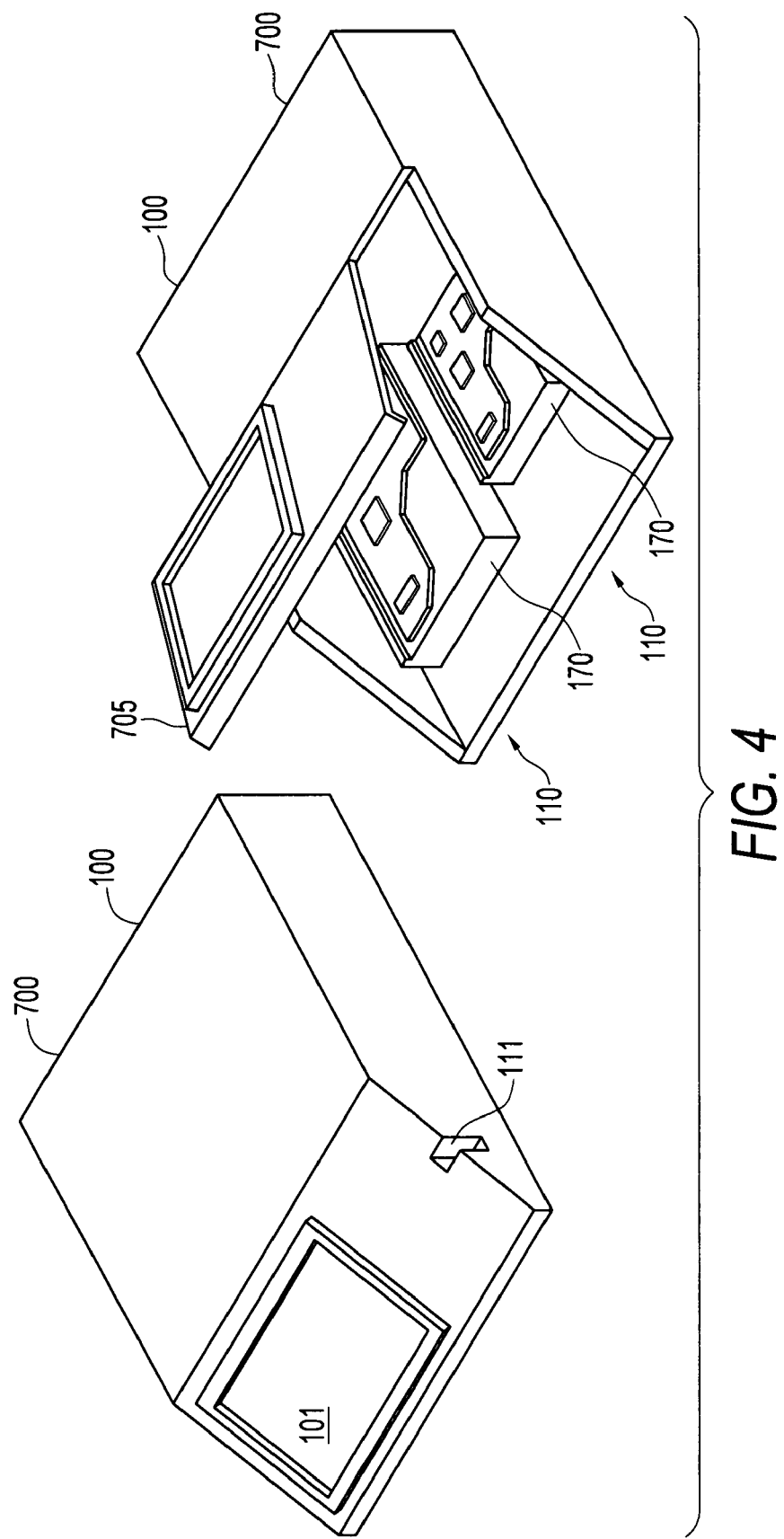
FIGS. 4-13 depict structural configurations for a hard drive erase system according to exemplary embodiments of the invention.

Referring to FIG. 4, the system 100 includes a stand alone base apparatus 700. The term stand-alone means that the apparatus 700 is configured to receive or connect to a hard drive 170 such that impediments to data erasure, such as the native device's BIOS, components of the hard drive itself, among others, are avoided. For example, the apparatus 700 can receive a hard drive 170 that is normally used with a different device, such as a personal computer (PC) for allowing the PC user functional access to the data. Alternatively, the apparatus 700 can be connected to a hard drive 170 in situ in its native device.

This is distinguishable from the conventional erasure technique described above of simply loading erasure software onto the PC to attempt to erase data from the PC hard drive 170 in its native device or as it is conventionally connected to enable user access to the data stored on the hard drive 170. Preferably, the apparatus 700 is physically separate from other apparatuses. However, the apparatus 700 may be physically adjacent to or physically incorporated into another apparatus or device, and may be in communication with another device via the Internet 151 or a computer network.

The base apparatus 700 can include drive bays 110, which are accessible via an access means, such as door 705, an opening, among others. Alternatively, where the apparatus 700 is to connect to a hard drive 170 in situ, one or more of the drive bays 110 can instead be a connecting means, such as a cable, probe or other device for providing communication between components of the apparatus 700 and the in situ hard drive 170.

The apparatus 700 also includes a user interface 101. Hard drives 170 a placed in the apparatus 170 and connected to a connecting device, such as a port, cable, probe, or any device, mechanism or means for establishing communication between system 100 and a hard drive 170. In one embodiment, the hard drive 170 is connected such that components that interfere with data erasure of the hard drive 170 are avoided. Cable connections 110a are shown in FIG. 5 as the connecting device, but other connections, such as a probe 110b, among others, can be used.

Figure 5:
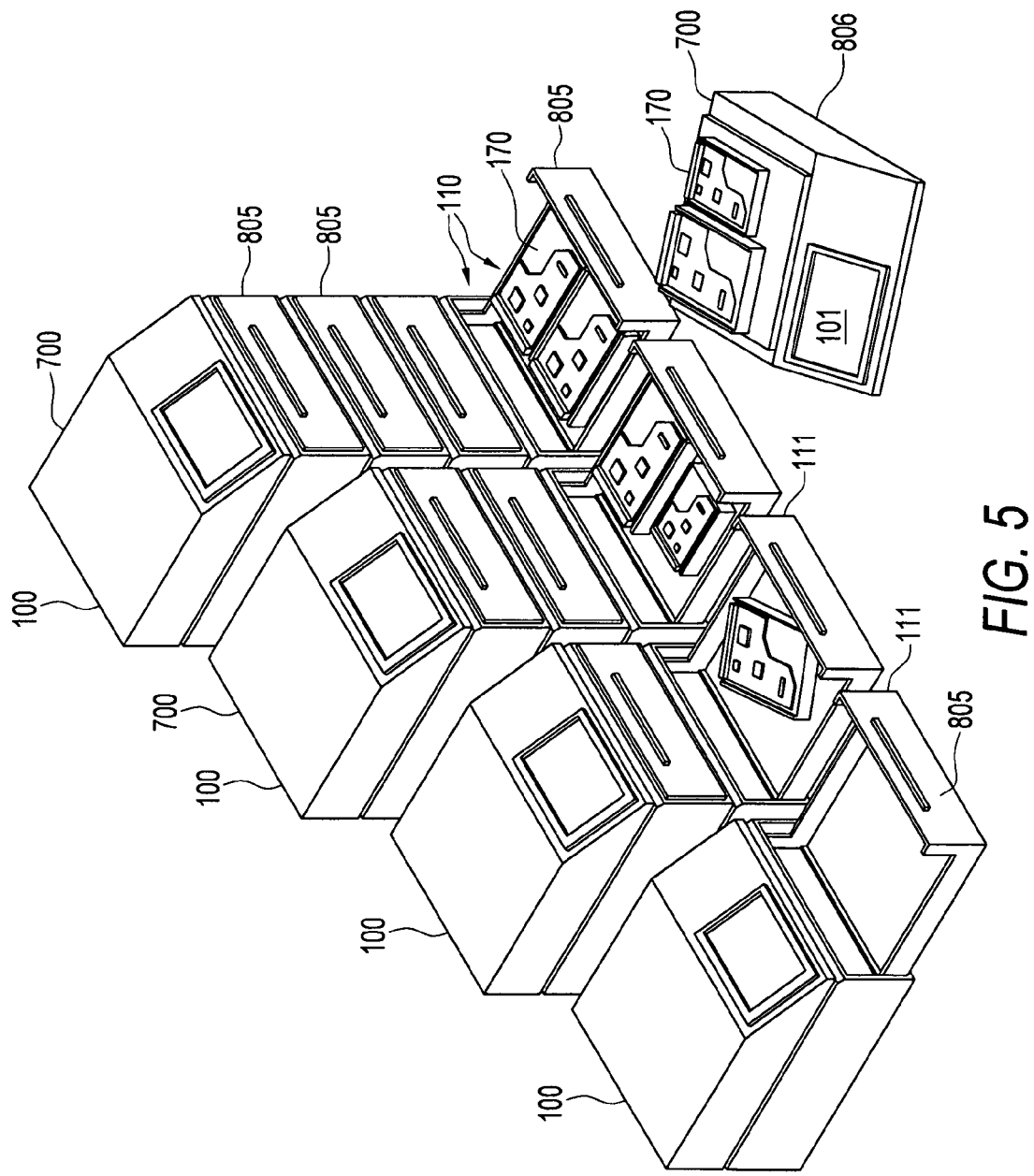

FIG. 5 depicts a more complex embodiment of the system 100 including the base apparatus 700. In the illustrated embodiment, the additional bays 110 are included in supplemental apparatuses 805, 806. Supplemental apparatuses 805, 806 contain drive bays 110 and means for interfacing with the base apparatus 700 (e.g., a port, cable, or any device, mechanism or means for establishing communication between the supplemental apparatus 805, 806 and base apparatus 700 such that the drive bays 110 of the supplemental apparatus 805, 806 are in communication with the system 110). As shown in FIG. 5, the supplemental apparatuses can be stackable over or under the base apparatus 700 and can be in the form of drawers 805 or a platform 806.

Figure 6:
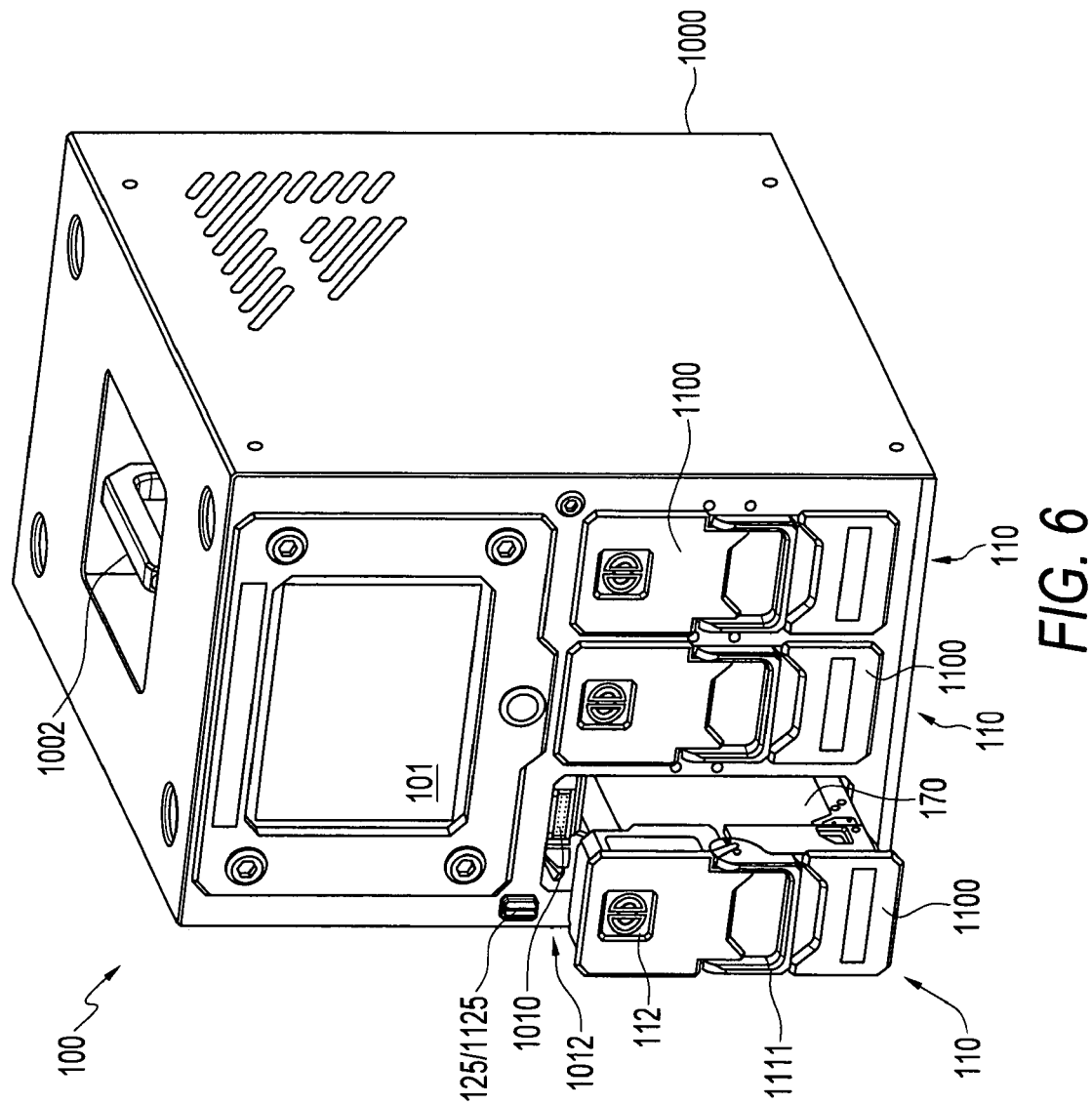
Figure 7:
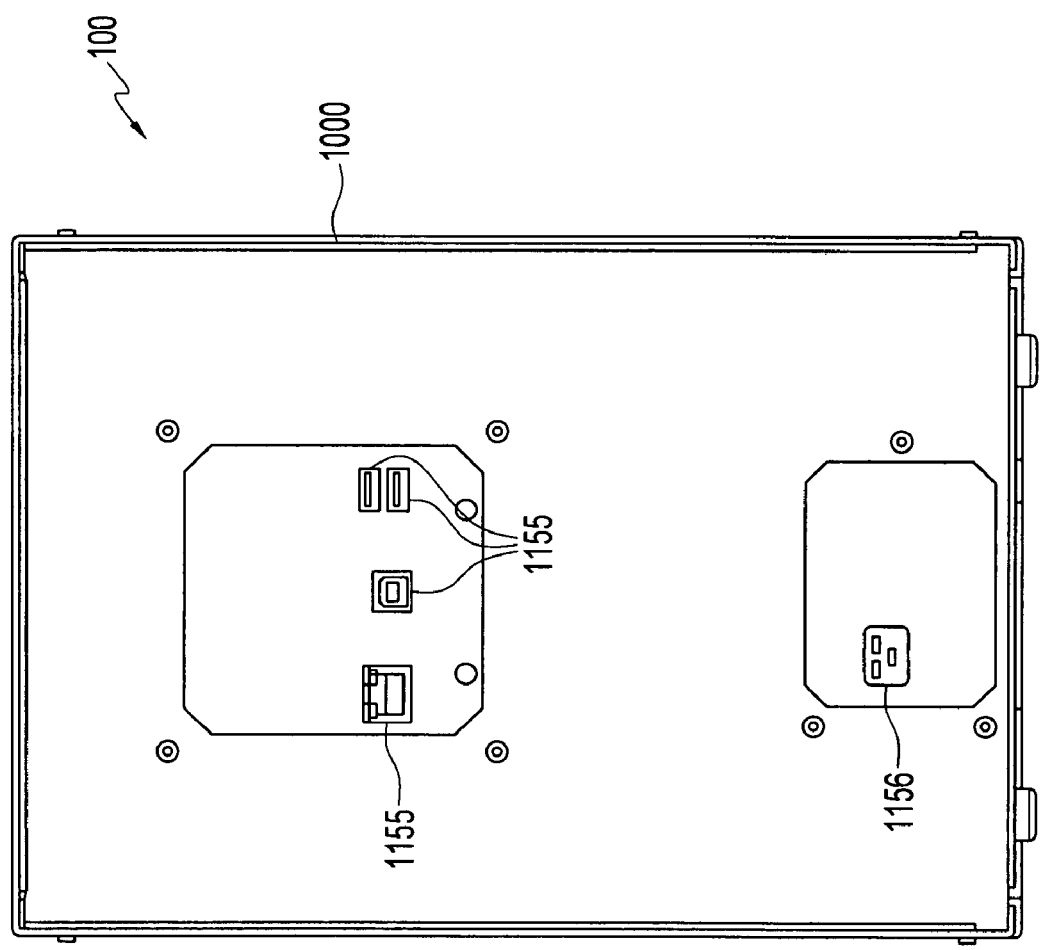

FIGS. 6-10 depict a readily portable structural embodiment of the system 100. As shown in FIGS. 6 and 7, the system 100 can configured within a single portable base apparatus 1000. FIG. 6 is a front and side view of the apparatus 1000 and FIG. 7 is a rear view of the apparatus 1000. The base apparatus 1000 includes an optional handle 1002 (FIG. 6) to promote portability. The base apparatus 1000 includes an interface 1156 for a power cord, so that the base apparatus 1000 can be connected to a power source. The base apparatus 1000 can also include a rechargeable battery (not shown) to enable use where a power source is not readily available.

The base apparatus also includes user interface 101 (FIG. 6), which is shown as a touch screen interface. The user interface could also be another type of interfaces, such as a screen and keyboard and/or an audio interface. The output device 125 is an integrated label printer having a label dispenser 1125 for printing certificates in the form of labels as described above. The base apparatus 1000 also includes ports 1155 (FIG. 7) (e.g., USB, ethernet and phone ports) to allow the base apparatus to be connected to the Internet and/or other base apparatuses 1000 or devices.

Figure 8:
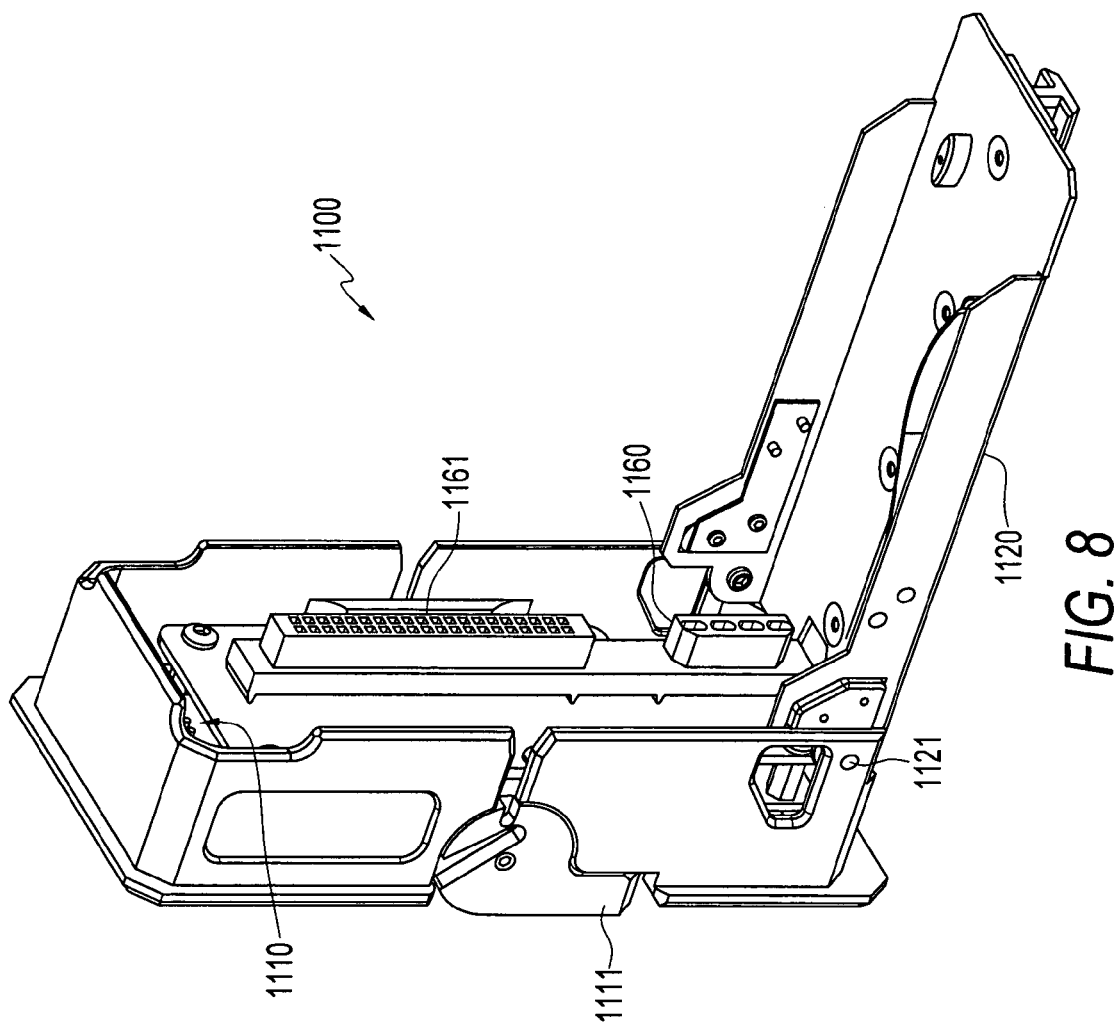
Figure 9:
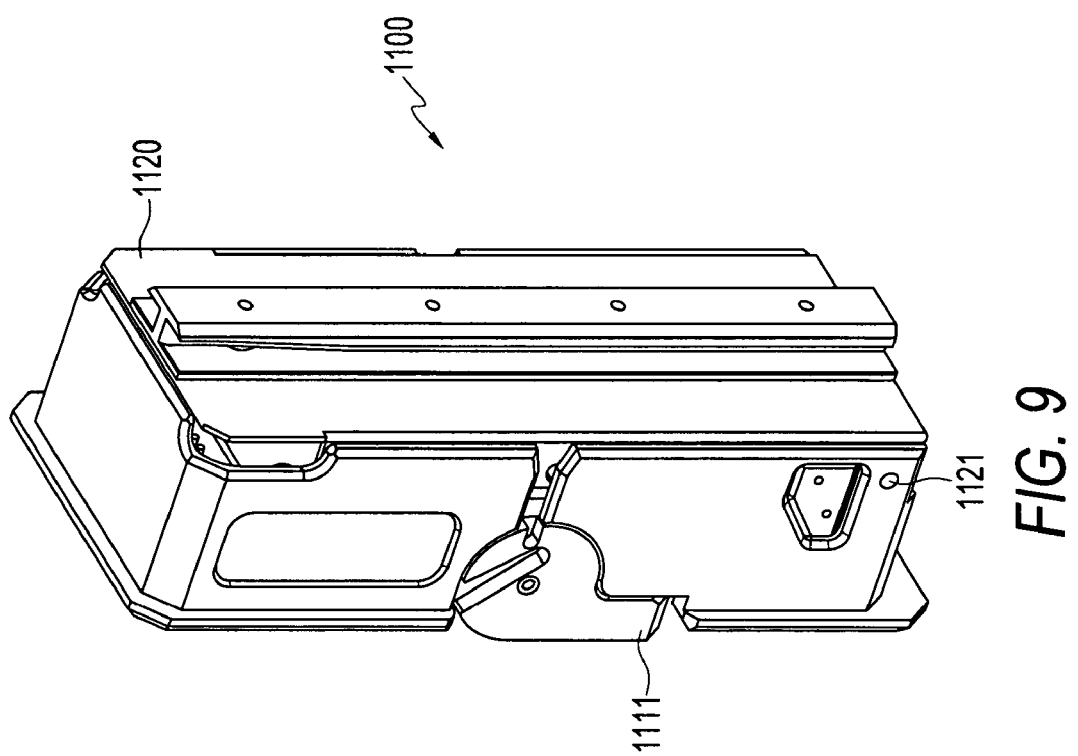
Figure 10:
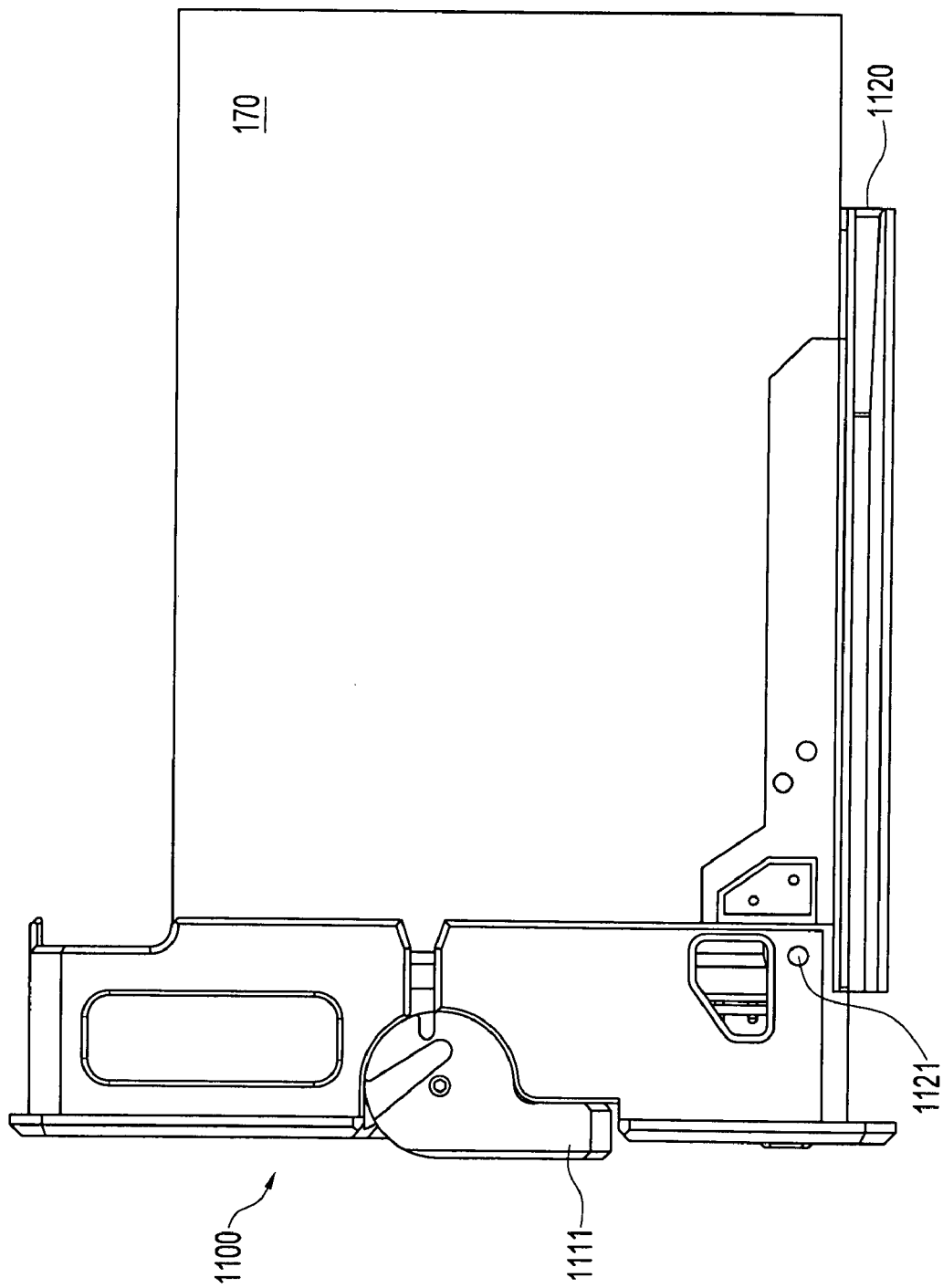

The apparatus 1000 also includes drive bays 110. Each drive bay 110 includes an opening 1012, which is configured to receive a drive module 1100. The drive module 1100, in turn, is configured to receive a hard drive 170. FIGS. 8-10 show additional views of the drive module 1100. As explained in more detail below, with the configuration of the drive bays 110 and drive modules 1100 illustrated in FIGS. 6 and 8-10, cables are not needed to provide a connection between hard drives 170 and the system 100.

As shown in FIG. 6, each drive bay 110 includes a port 1010, shown as a USB port, within the opening 1012. Each drive module 1100 includes a port 1110 configured to connect to the port 1010 of the drive bay 110. Thus, each drive module 1100 can be used interchangeably in each of the drive bays 110. It should be understood that any suitable port or connection providing communication between the drive module 1100 and the drive bay 110 can be used.

Each drive module 1100 also includes one or more hard drive ports 1160, 1161 (FIG. 8) configured to receive a hard drive 170. So that the system 100 can accommodate different types of hard drives 170, different drive modules 1100 can have different ports 1161, 1160 suitable for different types of hard drives 170.

Preferably, the one or more ports 1160, 1161 are provided on an interface board 1166. In the event replacement of the interface ports 1160, 1161 is desired (e.g., due to damage or if different ports 1160, 1160 are desired to accommodate a different type of hard drive), the interface board 1166 can be removed from the drive module 1100 and replaced with another interface board. This provides a cost reduction as compared to replacing the entire drive module 1100.

The drive module 1100 also includes a hard drive support portion 1120. The support portion 1120 serves to stabilize the hard drive 170 when it is connected to the drive module 1100. In the illustrated embodiment, the support portion 1120 also servers as a guide when the drive module 1100 is placed in a drive bay 110 to ensure that the drive module port 1110 connects to the drive bay port 1010. FIG. 10 depicts a side view of a hard drive 170 connected to a drive module 1100.

In the illustrated embodiment, the support portion is connected to the drive module 1100 by a hinge 1121. Accordingly, the support portion 1120 can be position in an open position (FIG. 8) or a closed position (FIG. 9). When in a closed position, support portion 1120 covers and protects the ports 1110, 1160, 1161 and promotes portability.

Each drive module 1100 includes a latch 1111, which activates a locking mechanism 111, such as a solenoid lock, among others. As shown in FIG. 6, each drive module 1100 also includes a status indicator 112. In the embodiment of FIG. 6, the status indicator includes LEDs of varying colors, which signal the status of the hard drive 170 in the drive bay 110. For example, green can indicate that a procedure is complete and the hard drive 170 can be removed, while red can indicate that a procedure is in progress and the drive bay 110 should not be opened.

It should be understood that one or more drive bays 110 according to the embodiments described herein could also be included in a conventional computer device. For example, a drive bay 110, including a drive module 1100, can be provided in a personal computer or other device to enable the device to accommodate various types of hard drives.

Figure 11:
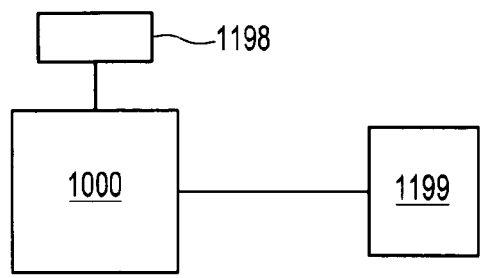
Figure 12:
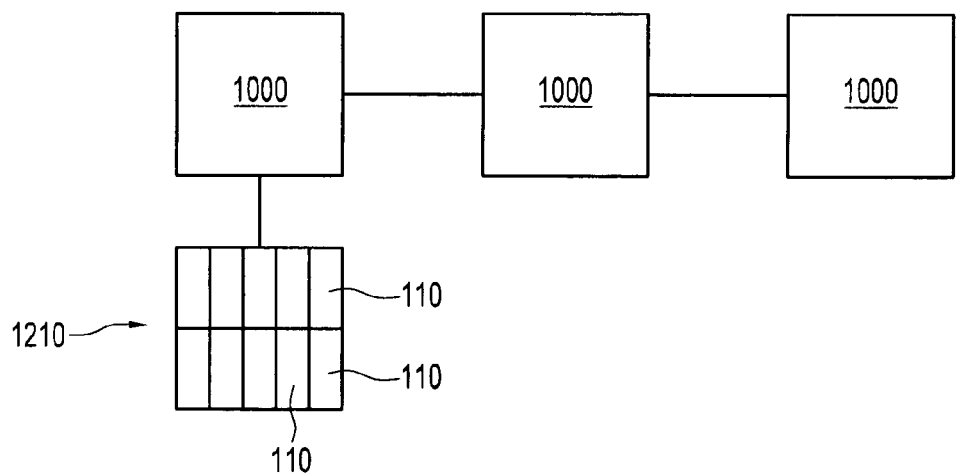
Figure 13:
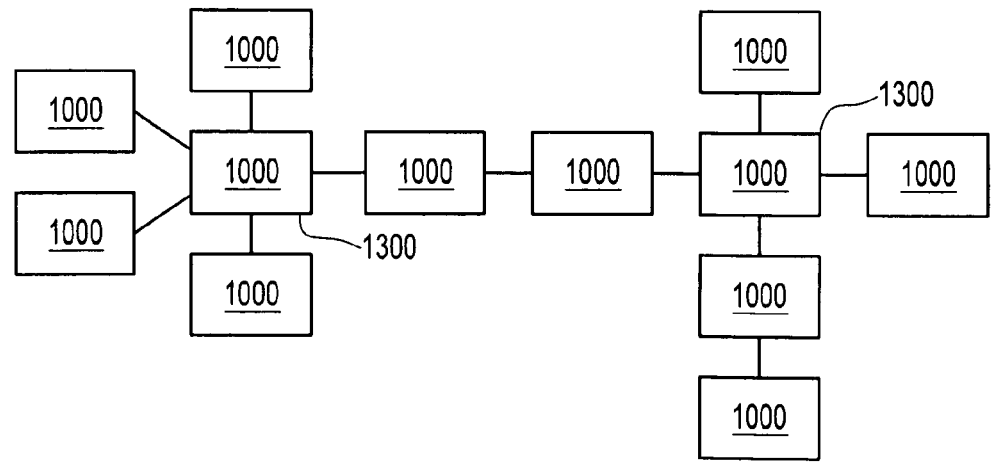

FIGS. 11-13 depict more complex embodiments of the system 100 including the base apparatus 1000.

FIG. 11 shows the base apparatus in communication with a laptop computer 1199 (or other personal computer device) and an external hard drive 1198 via ports 1155 (FIG. 7). In this configuration, the base apparatus 1000 serves as an external hard drive to the laptop 1199. The external hard drive 1198 can serve as the storage device 122 and/or receive data copied from hard drives 170 within the drive bays 110.

FIG. 12 illustrates multiple base apparatuses connected together via ports 1155 (FIG. 7) in a "daisy-chain" manner. In this configuration, each apparatus 1000 can function as both a client and a host device. Further, an expansion bay 1210 is connected to and in communication with a base apparatus 1000. The expansion bay 1210 includes additional drive bays 110, which are operated through the base apparatus 1000 to which the expansion bay 1210 is connected.

FIG. 13 depicts a "hub-and spoke" configuration of apparatuses 1000. In the FIG. 13 embodiment, the apparatuses 1000/1300 that are connected to multiple other apparatuses 1000 serve as a hub for controlling those other apparatuses 1000.

It should be understood that a variety of other configurations including one or more apparatuses 1000 are possible. Further, such other configurations can include an expansion bay 1210, laptop 1199(or other personal computing device) or external hard drive 1198.

The structural configurations depicted in FIGS. 4-13 are examples only and other structural configurations are possible. Further, the processes and devices described above illustrate preferred methods and devices of many that could be used and produced. The above description and drawings illustrate exemplary embodiments, which achieve the objects, features, and advantages of the present invention. It is not intended, however, that the present invention be strictly limited to the above-described and illustrated embodiments. Any modifications of the present invention that come within the spirit and scope of the following claims should be considered part of the present invention.

What is claimed as new and desired to be protected by Letters Patent of the United States is:

1. A system for erasing hard drives, the system comprising:
   a control device, the control device configured to support an erase module, the erase module configured to erase a hard drive such that data erased from the hard drive is forensically unrecoverable;
   a user interface enabling user input;
   a plurality of drive bays connected to the control device, each drive bay configured to provide communication between a hard drive and the control device, wherein each drive bay comprises:
   an opening,
   a first port located within the opening, and
      a drive module, the drive module having at least one second port configured to receive a hard drive and at least one third port for connecting to the first port
      a support portion configured to stabilize the received hard drive, wherein the support portion is affixed to the drive module by a hinge, such that the support portion is moveable between an opened position and a closed position, and wherein, in the closed position, the support portion covers the second and third ports;
   a storage device in communication with the control unit for storing information; and
   an output device in communication with the control unit for outputting information.

2. A computer device comprising:
   at least one drive bay comprising a first port and configured to receive a drive module, and
   at least one drive module, the at least one drive module having at least one second port configured to receive a hard drive and at least one third port for connecting to the first port, wherein each drive module further comprises a support portion configured to stabilize the received hard drive, wherein the support portion is affixed to the drive module by a hinge, such that the support portion is moveable between an opened position and a closed position, and wherein, in the closed position, the support portion covers the second and third ports.

3. A method for erasing a plurality of hard drives, the method comprising the acts of:
   providing a plurality of apparatuses, each apparatus configured to erase a plurality of hard drives, each apparatus comprising:
   a storage device,
   an output device, and
   a plurality of drive bays, each drive bay for providing communication between a hard drive and the apparatus;
   placing a first hard drive in a first drive bay of a first apparatus;
   operating the first apparatus to conduct a first erase procedure to erase data from the first hard drive;
   subsequent to the first erase procedure, storing first information to the storage device about the first erase procedure, the first information comprising an indication of success or failure and at least one item from the group consisting of: a drive serial number, a drive manufacture, a drive model, a drive size, a start date/time stamp, an end date/time stamp, an erasure method and a user who initiated the erase procedure;
   placing a second hard drive in a second drive bay of a second apparatus;
   operating the second apparatus to conduct a second erase procedure to erase data from the second hard drive;
   subsequent to the second erase procedure, storing second information to the storage device about the second erase procedure, the second information comprising an indication of success or failure and at least one item from the group consisting of: a drive serial number, a drive manufacture, a drive model, a drive size, a start date/time stamp, an end date/time stamp, an erasure method and a user who initiated the erase procedure;
   operating the output device of the first apparatus to output via an Internet a certificate containing the first information to a database separate from the first apparatus; and
   operating the output device of the second apparatus to output via an Internet a certificate containing the second information to the database, the database being separate from the second apparatus.

4. The method of claim 3, wherein conducting the first erase procedure comprises writing over the data to be erased using a current having a lower frequency than a current used to write the data.

5. The method of claim 3, wherein the act of placing the first hard drive in the first drive bay comprises providing communication between the hard drive and the apparatus such that impediments to data erasure in the hard drive are avoided.

6. The method of claim 3, further comprising locking the first hard drive within the first drive bay using a locking device.

7. The method of claim 6, further comprising detecting a locked or unlocked status of the locking device.

8. The method of claim 7, wherein, if, during the first erase procedure, the detected status of the locking device is unlocked, designating the erase procedure as failed.

9. The method of claim 3, wherein the first erase procedure renders the erased data forensically unrecoverable.

10. The method of claim 3, wherein the act of conducting the first erase procedure comprises conducting a predetermined number of write-overs.

11. The method of claim 3, further comprising placing a third hard drive in a third drive bay of the first apparatus and conducting a third erase procedure during at least a portion of a same time that the first erase procedure is being conducted.

12. The method of claim 3, wherein the first erase procedure comprises:
   writing over the first hard drive,
   subsequent to the writing, erasing all data from the first drive such that the erased data is forensically unrecoverable, and
   subsequent to the erasing, confirming that the data was erased by reading at least a portion of the first hard drive.

13. The method of claim 3, wherein the first hard drive comprises initial data and the first erase procedure comprises:
   writing predetermined data to a plurality of predetermined portions of the first hard drive,
   subsequent to the writing step, erasing the initial data and the predetermined data from the first drive such that the erased data is forensically unrecoverable, and
   subsequent to the erasing step, confirming that the data was erased by reading only the predetermined plurality of portions of the first hard drive written to in the writing step such that no initial data is read.

* * * * *